Oct. 25, 1938.  H. J. MANKOFF  2,134,258
MOTOR VEHICLE POWER TRANSMISSION
Filed July 10, 1937  3 Sheets-Sheet 1
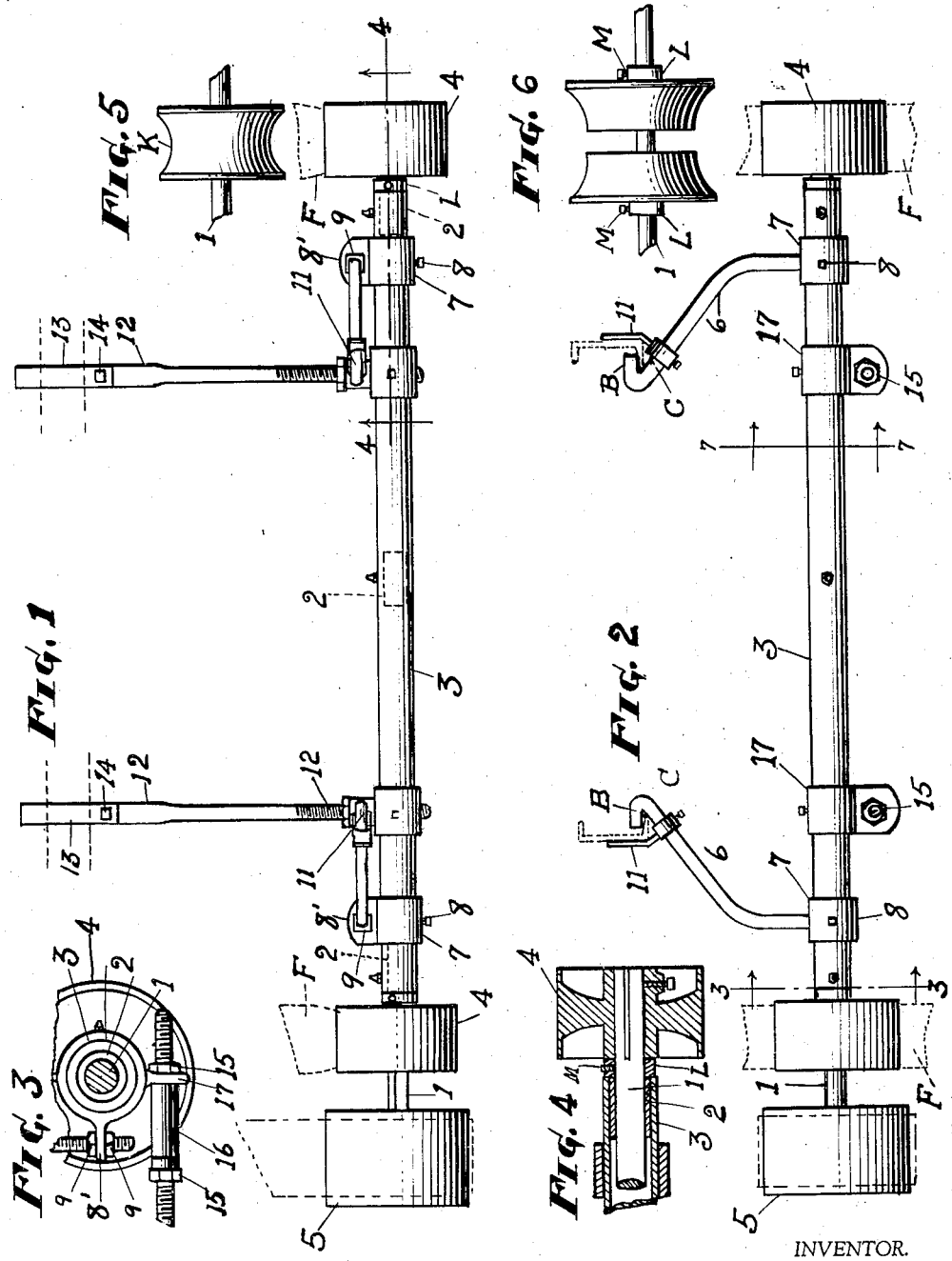
INVENTOR.
HENRY J. MANKOFF
BY U. G. Charles
ATTORNEY.

Oct. 25, 1938.　　　H. J. MANKOFF　　　2,134,258
MOTOR VEHICLE POWER TRANSMISSION
Filed July 10, 1937　　　3 Sheets-Sheet 2
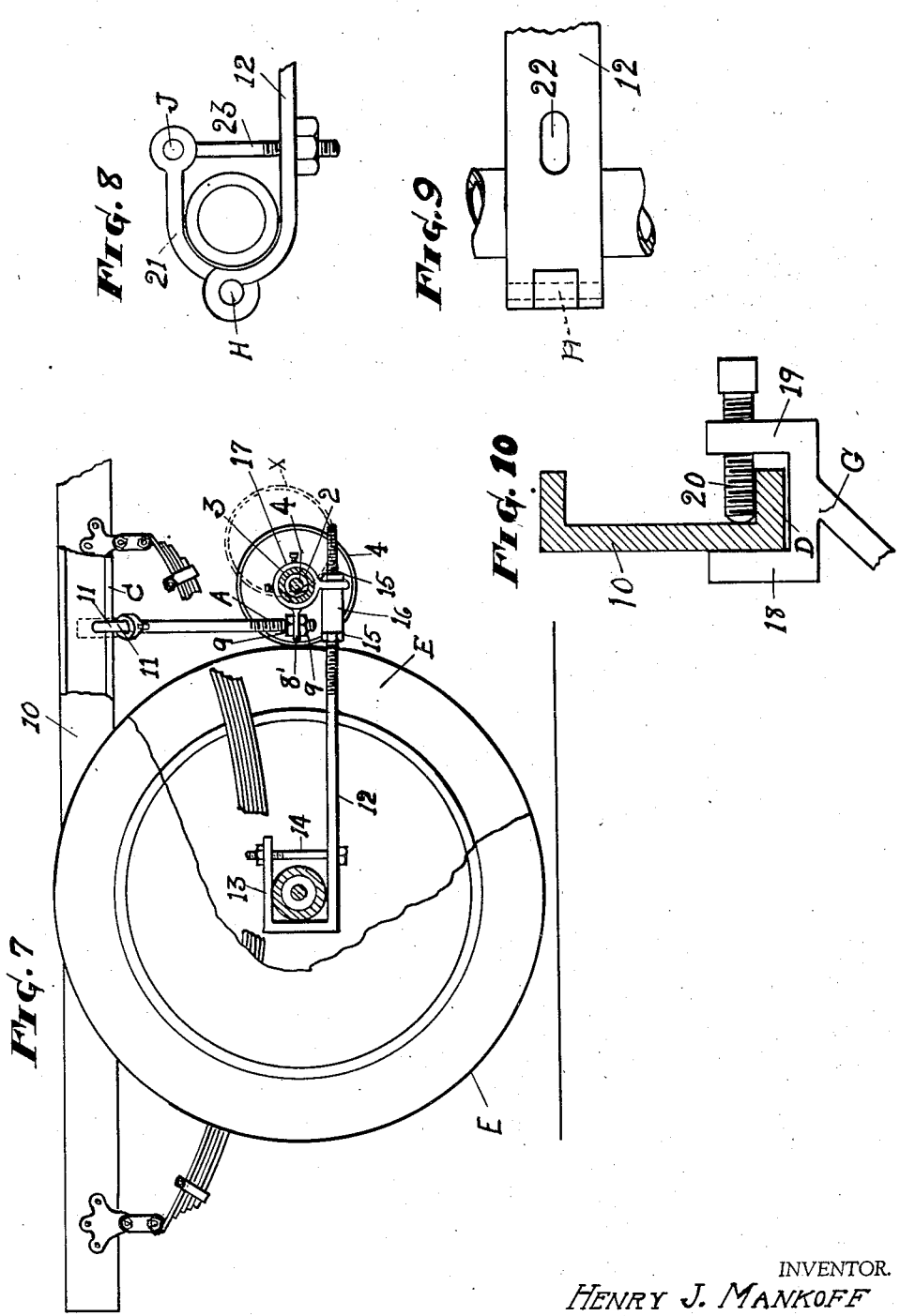
INVENTOR.
HENRY J. MANKOFF
BY U. G. Charles
ATTORNEY.

Oct. 25, 1938.	H. J. MANKOFF	2,134,258
MOTOR VEHICLE POWER TRANSMISSION
Filed July 10, 1937	3 Sheets-Sheet 3

INVENTOR:
HENRY J. MANKOFF
BY
U. G. Charles
ATTORNEY.

Patented Oct. 25, 1938

2,134,258

UNITED STATES PATENT OFFICE 2,134,258

MOTOR VEHICLE POWER TRANSMISSION

Henry John Mankoff, Wichita, Kans.

Application July 10, 1937, Serial No. 152,963

7 Claims. (Cl. 74—13)

The invention relates to motor vehicle power transmission and has for its chief object, the transmission of power from the wheels of a motor driven vehicle through the medium of pulleys adjustably carried by the chassis of the vehicle and having efficient means to control the engagement of the pulleys with the wheels of the vehicle.

A further object of my invention is to provide an oil tight housing for the pulley shaft and bearings, the shaft reversible longitudinally to avoid replacement of the belt driving pulley on the ends of the shaft.

A still further object of my invention is to provide an adjustably arranged brace rod and pendent hanger arms to vary the position of the pulley shaft with respect to a vertical or horizontal plane, as governed by varying diameters of vehicle wheels and position of the chassis frame from the axis of the wheel vertically.

A still further object of my invention is to provide an adjustable clamp for the brace rod that may be applied to rear axles varying in diameter, so that the device may be applied to different makes of vehicles.

A still further object of my invention is to provide a power transmission that will impart its torque to a stationary machine or to a machine portably carried by the vehicle.

These and other objects will hereinafter be more fully explained, reference being had to the accompanying drawings forming a part of this specification and in which like characters will apply to like parts in the different views.

Referring to the drawings:—

Fig. 1 is a plan view of the power transmission device, showing the brace rods.

Fig. 2 is a front elevation of Fig. 1, showing the pendent hanger arms.

Fig. 3 is an enlarged view of the brace connection to the shaft housing and its longitudinal adjustment, taken on line 3—3 in Fig. 2.

Fig. 4 is a sectional view through the shaft housing and pulley longitudinally, taken on line 4—4 in Fig. 1.

Fig. 5 is a modification of the vehicle wheel pulleys having a peripheral concavity conforming to the tire of the wheel.

Fig. 6 is a modification of Fig. 5, in which the pulley is split on its center zone as adjusting means for tires varying in diameter with respect to cross section.

Fig. 7 is a side view of a vehicle rear wheel showing the device connected in operative position and the wheel elevated.

Fig. 8 shows a modification of the axle clamp hingedly arranged.

Fig. 9 is an inverted view of Fig. 8, showing the slot through which the clamp bolt will engage.

Fig. 10 is an enlarged view of a modified connection for the pendent support to the chassis side bar.

Figure 11:
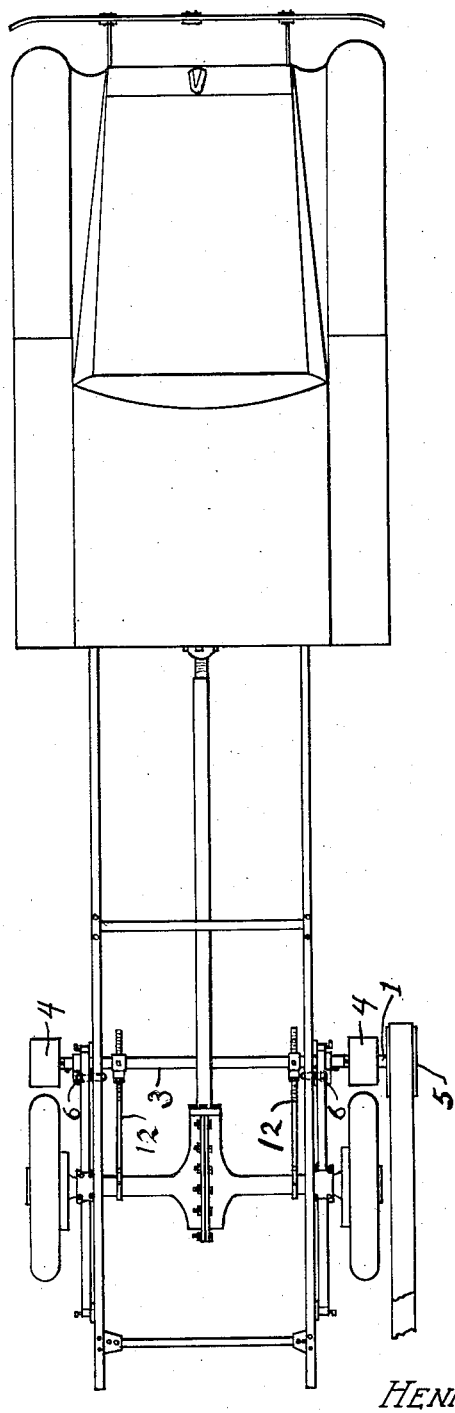
Fig. 11 is a plan view of a motor driven vehicle, showing the power transmission in general as applied, the pulleys being disengaged.

The invention herein disclosed relates to a power transmitting device as applied to a motor driven vehicle to impart torque for the operation of machinery such as feed grinders, circle saws, electric current generators, pumps, drilling equipment or other machinery.

The mechanism in detail consists of a shaft 1 trunnioned in bearings 2, adjacent each end of an enlarged oil tight tubular housing 3, secured rigid to the shaft, adjacent each end of the housing is a pulley 4 as turning means for said shaft, when the said pulleys are in contact with wheel tires that are driven by the motor of the vehicle, and the said shaft has a belt pulley 5 secured to the end thereof that extends outward from one of said pulleys and rotatable therewith, transmitting torque to a machine as heretofore described, by an arm 6 secured near each end thereto by a collar 7 respectively, each of said collars being secured by a set screw 8 threadedly engaging therein to lock the same stationarily at a selected position, and the said collar has an apertured tongue 8' integrally joined and radially extending on a horizontal plane, so that the threaded end portion as at A, will slidably engage in the aperture, adjusting the housing vertically to align said pulleys 4 with the horizontal axis of the vehicle wheel, and each being secured in such position by jamb nuts 9, oppositely engaging on the tongue.

The upper end of said arm has a hook B, to engage on the lower leg C, of the chassis frame 10 and secured thereto by a stop 11, adjustably carried by said arm and being secured to engage with the web D of the frame opposite the hook, at which point the arm will rock or slidably adjust and the said arms each are bent, as shown in Fig. 2, to avoid contact with the vehicle springs, and the said housing being pendently carried, will position the said pulleys 4 in alignment with their respective tires of the vehicle wheels, for engagement therewith simultaneously or separately through the medium of a rod 12, positioned near each end of the housing and extending rearward connecting rigidly to the axle housing of the vehicle by clamp jaws 13, tensioned to engagement by a bolt 14, the other end of the rod being threaded to engage jamb nuts 15, to snug engagement at each end of a sleeve 16 secured to the housing by a collar 17, and through said sleeve the rod will slide while being adjusted, moving said pulley to and from engagement with the tires E of the wheels, said tires being shown by dotted lines F in Figs. 1 and 2.

It will be understood that the wheels of the vehicle will be raised from their support, approximately as shown in Fig. 7, at the time of transmitting power thereby as herein set forth.

Certain modifications have been inserted in the drawings relating to the pulleys as shown in Figs. 5 and 6 and the axle clamp illustrated in Figs. 8 and 9, also the hook of the pendent supporting arm shown in Fig. 10, each being explained as follows.

The hook substitution as modified, consists of a bifurcated head integrally joined to the upper end of the arm as at G, the legs 18 and 19 being spaced apart to receive the lower web D of the frame there-between, leg 19 is apertured and threaded to engage a threaded stud 20, as securing means for the head to the frame as shown, leg 18 will resist the tension, binding the head in such a way that rocking movement may be had at the point of attachment.

The clamp substitution as modified, consists of a member 21 hingedly connected as at H to rock to and from rod 12, said rod being flattened and having an elongated aperture 22, through which a tie bolt 23 will engage, said bolt pivotally connected as at J to the free end of member 21, by which means the clamp is adjustable to axle housings varying in size.

The pulley substitution as modified, may have a peripheral concavity K conforming the thread of a tire with respect to cross section as shown in Fig. 5, and a further modification as shown in Fig. 6, in which case the said pulley is in two parts, being divided at its center zone as adjustable means for tire treads varying in width, each half of the pulley having a hub L outwardly extending and a set screw M to secure the same to shaft 1, and such other modification may be employed as lie within the scope of the appended claims.

Having fully described my invention, what I claim as new and desire to secure by Letters Patent is:—

1. In a motor vehicle power transmission, in combination with a motor driven vehicle, a shaft and a housing in which the shaft is trunnioned, the shaft having a pulley near each end thereof to align with their respective wheels of a vehicle, means to pendently carry the housing by the chassis of the vehicle, and means to connect said housing to the axle housing of the vehicle to move said pulleys to and from engagement with said vehicle wheels, each of said means adjustably arranged to move said shaft housing vertically and horizontally respectively, a belt pulley secured to the shaft between its end and adjacent pulley for the purpose specified.

2. In a motor vehicle power transmission, in combination with the chassis of a motor driven vehicle, the chassis embracing a frame, wheels and driveshaft housing, a shaft having a pulley secured thereto near each end thereof, an oil tight housing in which the shaft is trunnioned, said housing to extend longitudinally from one pulley to the other, and a belt pulley secured to said shaft external of one of its pulleys, an adjustable pendent supporting means to carry the said housing by the frame of the chassis so that the first named pulleys will align with their respective wheels of the vehicle, and bearing vertically adjusted to align with the diametrical axis of the wheels, an adjustable rod connecting each end of said housing to their respective ends of the drive axle housing, said rod adjustment to move said pulleys to and from engagement with the wheels of the vehicle when the wheels are turned.

3. In a motor vehicle power transmission, in combination with the chassis of a motor driven vehicle, a housing, oil tight and having shaft bearings secured therein, an adjustable arm for each end of the housing as pendent carrying means for connecting said housing to the frame of the chassis, an adjustable rod connecting each end of said housing to the rear axle housing, a shaft trunnioned in said housing, said shaft having a pulley rigidly secured thereto adjacent each end of said housing, each pulley being aligned with its respective wheel of the vehicle, a belt pulley secured rigidly to the shaft adjacent one of first said pulleys, all substantially as shown and for the purpose specified.

4. In a motor vehicle power transmission, in combination with the chassis of a motor drive vehicle, a tubular housing having a bearing positioned in each end thereof and one medially of the housing, adjustable pendent carrying means for each end of the housing, said means attached to the frame of the vehicle, and adapted to rock to and from the wheels of said vehicle, adjustable rods connecting said housing to the axle housing of the vehicle, to brace and move first said housing longitudinally of the vehicle toward and from its wheels.

5. In a motor vehicle power transmission, as recited in claim 4, a shaft trunnioned in the bearings of the tubular housing, the shaft having a pulley rigidly secured thereto adjacent each end of said tubular housing, each of said pulleys adapted to engage with their respective drive wheel of the vehicle, when moved to snug engagement therewith by said adjustable rods.

6. In a motor vehicle power transmission, a mechanism of the class described comprising in combination with a motor vehicle, the vehicle having drive wheels, axle housing and side frame members, a tubular housing having a plurality of bearings therein and spaced apart, a shaft trunnioned in the bearings, rendering the housing oil tight at its ends and each end of the shaft extends outward from its respective end of the housing, the said extending portions of the shaft, each having a pulley secured thereto in alignment with their respective drive wheels, and another pulley secured to the end of the shaft adjacent one of the first said pulleys, last said pulley functioning as a power transmission through the medium of a belt, a pendent supporting means for each end of the housing to its respective side of the frame, said means comprising an arm and means to rockably connect the upper end of each arm to its respective side of the frame, the other end of said arms having a portion thereof threaded to engage a pair of nuts threadedly engaging thereon, a collar secured to each end of the said housing, said collars each having an apertured tongue radially extending therefrom, the apertures to receive their respective threaded end portion of the arm and secured by the nuts engaging the tongue oppositely to raise and lower the housing, adjustable connecting means for the axle housing to the said tubular housing whereby the first named pulleys are moved to and from engagement with the wheels of the vehicle.

7. In a motor vehicle power transmission, a mechanism as recited in claim 6, the adjustable connecting means for the axle housing to the said tubular housing consisting of a horizontally positioned rod having jaws on one end and means to clamp the jaws to the axle housing of the vehicle, the said rod being threaded longitudinally from the other end inward, a collar having a sleeve tangentially positioned and secured to the collar, means to secure the collar to the tubular housing, the sleeve to receive the threaded end portion of the rod slidable therein and being secured at a selected position by a threaded nut engaging on the rod at each end of the sleeve, by which means the said tubular housing is moved toward and from the axle housing for the purpose specified.

HENRY JOHN MANKOFF.